Figure 1:
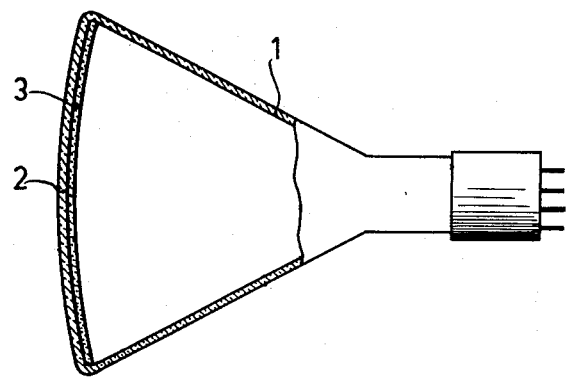

United States Patent [19]

De Mesquita et al.

[11] 3,715,611
[45] Feb. 6, 1973

[54] CATHODE-RAY TUBE CONTAINING CERIUM ACTIVATED YTTRIUM SILICATE PHOSPHOR

[75] Inventors: Albert Hijman Gomes De Mesquita; Alfred Bril, both of Emmasingel, Eindhoven, Netherlands

[73] Assignee: U.S. Philips Corporation, New York, N.Y.

[22] Filed: Aug. 7, 1969

[21] Appl. No.: 848,179

[30] Foreign Application Priority Data

Aug. 9, 1968   Netherlands ....................... 6811326

[52] U.S. Cl. ..................... 313/92 PH, 252/301.4 F
[51] Int. Cl. ........................... C09k 1/54, H01j 29/20
[58] Field of Search ............................. 252/301.4 F

[56] References Cited

UNITED STATES PATENTS

| 2,467,689 | 4/1949 | Overbeek | 252/301.4 F |
| 3,104,226 | 9/1963 | Struck | 252/301.4 P |
| 3,523,091 | 8/1970 | McAllister | 252/301.4 F |
| 3,250,722 | 5/1966 | Borchardt | 252/301.4 R |
| 3,481,884 | 12/1969 | Palilla | 252/301.4 P |

OTHER PUBLICATIONS

Peters, Cathodoluminescent Lny $(SiO_2)_4$: Tb Phosphors, Journal of Electrochemical Society Vol. 117, No. 7, July 1969, pages 985–988.

*Primary Examiner*—Robert D. Edmonds
*Attorney*—Frank R. Trifari

[57] ABSTRACT

A flying-spot scanner or a color television tube having indexing strips comprises a luminescent screen or indexing strips of a substantially non-persistent luminescing material consisting of yttrium silicate activated by trivalent cerium.

8 Claims, 2 Drawing Figures

CATHODE-RAY TUBE CONTAINING CERIUM ACTIVATED YTTRIUM SILICATE PHOSPHOR

The invention relates to a cathode-ray tube provided with a luminescent screen and to a luminescent material for use in such a screen.

Cathode-ray tubes provided with a luminescent screen which emits radiation upon excitation by the electron beam generated in the tube are used for many purposes, for example, for displaying television images in color or in black and white, for recording oscillograms and for flying-spot scanners. Dependent on their use, the materials to be used in the luminescent screens must have different properties, for example, as regards spectral energy distribution, energy conversion efficiency, saturation, etc. A property which is always desired is of course that the energy conversion of the impinging electrons into radiation is effected at a high efficiency.

For some uses, for example, in flying-spot scanners a paramount factor is the decay time of the radiation of the luminescent material. In this respect and in the description following hereinafter the decay time is understood to mean the time during which the intensity of the radiation emitted by the luminescent material, after discontinuation of the electron bombardment, decrease to $1/e$ the value of the intensity just before discontinuation of the electron bombardment.

In flying-spot scanners the luminescent screen exclusively serves as a light source. The electron beam by which the luminescent screen is excited moves in such scanners in accordance with a given pattern, sometimes also called raster, across the luminescent screen. Unlike the electron beam in television display tubes, the electron beam is then not modulated. As a result a fast moving luminous spot of constant intensity is produced on the luminescent screen. The light from this moving luminous spot is projected on a document to be displayed, for example, a lantern slide, a film or a security paper and is partly transmitted or reflected thereby. The transmitted or reflected light is directed on a photo-cell in which it is converted into an electrical signal. This electrical signal may then be transmitted with the aid of known communication means to a device in which a picture of the transmitted document is formed.

In the flying-spot scanner, the requirement must be imposed that the radiation incident on the photocell is exclusively correlated with the optical absorption at the area of the spot of the documents which must be displayed at that moment. This gives rise to the requirement that the decay time of the luminescent radiation relative to the time of the electron beam remaining at a given area must not be long. If, as is very common practice, the scanning speed of the luminescent screen is equal to the speed at which a normal television display screen is scanned, this leads to the requirement that the decay time must be smaller than approximately $10^{-7}$ sec.

A plurality of luminescent materials has been found which satisfy this requirement and which have in addition a fairly high conversion efficiency. One of these substances, which is frequently used, is the so-called gehlenite, (composition $Ca_2Al_3SiO_7$) which is activated by trivalent cerium. The maximum emission of this material upon excitation by electrons lies at approximately 410 nm.

For reasons similar to those as described above, a luminescent material having a very small decay time is also desired for use in the so-called indexing strips in indexing cathode-ray tubes which serve to display colored images, for example, colored television images. In these tubes the picture display screen comprises strips having materials luminescing in different colors from which the picture to be displayed is composed. These strips, which generally emit red, green and blue light, are provided on the screen in so-called triplets. As is known it is necessary for the picture display screen to be scanned very accurately for displaying colored images with the aid of a cathode-ray tube. This means that the area where the electron beam is incident on the screen at a given instant must exactly be determined. To satisfy this requirement the indexing display tube employs the indexing strips which likewise consist of luminescent material. When scanning the display screen the electron beam impinges upon one of these indexing strips at a given instant, so that this emits its characteristic radiation. This radiation is directed on a photo-cell mostly located outside the tube and converted in this cell into an electrical signal which is applied to the circuit arrangement which effects the scanning movement of the electron beam and stabilizes this movement.

The light originating from the strips of luminescent material of the triplets may of course not influence the scanning circuit. Consequently a photo-cell or a combination of a photo-cell and a filter is used which is insensitive to the radiation emitted by the triplets. A luminescent material which only emits radiation of shorter wavelengths than the light from the triplets is mostly used in the indexing strips; the maximum of this radiation lies preferably between 350 and 400 nm. Radiation of wavelengths shorter than 350 nm. cannot generally pass the glass envelope of the tube and thus does not reach a photo-cell located outside the tube.

Until now the gehlenite already referred to above has preferably been used also for the indexing strips, although the maximum emission thereof is actually slightly too high, namely at approximately 410 nm.

Although it had been realized that a very short decay time is necessary for both flying-spot scanners and for indexing display tubes, it had so far not been considered that a luminescent material of the desired short decay time, for example, gehlenite may sometimes still emit a considerable amount of radiation after the instant when the intensity of the radiation has reached the value of $1/e$. This so-called persistence is sometimes still clearly noticeable after one tenth of a second and causes a disturbing electrical signal in the photo-cell.

A cathode-ray tube according to the invention is provided with a luminescent screen which is characterized in that it comprises an yttrium silicate activated by trivalent cerium and luminescing upon electron excitation and which is defined by the formula:

wherein
  $p$ has the value of 1 or 2, and
  $2 \cdot 10^{-4} \leq q \leq 2 \cdot 10^{-1}$.

The materials which satisfy the above given formula and conditions have a decay time which lies between $2 \cdot 10^{-8}$ and $5 \cdot 10^{-8}$ sec., they have a high conversion efficiency and are only very slight persistent.

The maximum of the emission of a material wherein $p = 1$ lies between approximately 400 and 460 nm. This material will preferably be used in tubes for flying-spot scanners, particularly when transmitting colored images and will not be used in indexing display tubes. For that purpose the material wherein $p = 2$ which has a maximum emission between approximately 360 and 400 nm is more suitable.

The cerium content expressed by the factor of q has some influence on the conversion efficiency and on the persistence phenomenon. The shortest persistence times and the highest efficiencies are both obtained if $10^{-3} \leq q \leq 5.10^{-2}$.

This may be evident from the following tables.

TABLE I

| cerium content (q) | conversion efficiency ($\eta$) in % | persistence in % |
|---|---|---|
| 0.001 | 3 | 1,5 |
| 0.005 | 4.5 | 0.4 |
| 0.01 | 6.5 | 0.1 |
| 0.02 | 4 | 0.6 |
| 0.05 | 4 | 0.7 |
| 0.10 | 2 | 1.3 |

TABLE II

| cerium content (q) | conversion efficiency ($\eta$) in % | persistence in % |
|---|---|---|
| 0.001 | 5 | 0.1 |
| 0.005 | 6 | < 0.1 |
| 0.01 | 6 | < 0.1 |
| 0.02 | 5.5 | < 0.1 |
| 0.05 | 4.5 | < 0.1 |
| 0.10 | 2 | < 0.1 |

It may serve for comparison that the conversion efficiency $\eta$ of gehlenite having a cerium content of 0.04 is approximately 5 percent and the persistence is 5 to 10 percent.

The percentage of persistence is measured as follows.

The material to be measured is provided on the screen of a cathode-ray tube and excited in a repeating manner therein by means of an electron beam which is modulated by a signal giving the beam its full intensity for 20 microseconds and entirely suppressing the beam for 80 subsequent microseconds. The light emitted by the luminescent material is measured with the aid of a photo-cell after a given period to stabilize the material in its excited condition. Tables I and II show the ratios of the intensity after 100 $\mu$ sec. and that after 20 $\mu$ sec.

The invention will now be described with reference to a drawing and two examples showing preparation of luminescent materials for use in tubes according to the invention.

FIG. 1 of the drawing diagrammatically shows a cathode-ray tube according to the invention.

Figure 2:
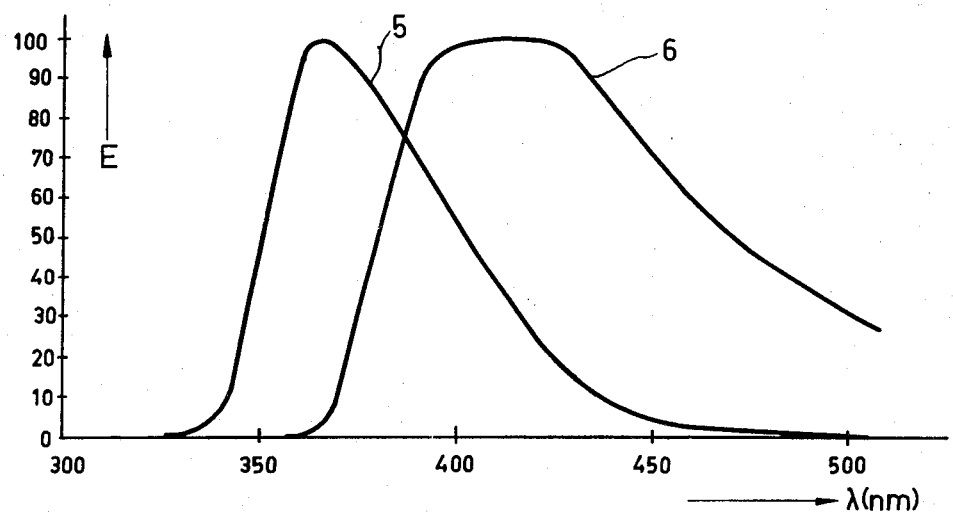

FIG. 2 of the drawing shows in a graph the spectral energy distribution upon excitation by electrons of the materials prepared in accordance with the examples mentioned below.

EXAMPLE I.

A mixture was made of
1.474 gms of hydrated $SiO_2$ ($SiO_2$-content 89.5 percent)
0.146 gms of $YF_3$
0.066 gms of $Ce_2O_3$
2.099 gms of $Y_2O_3$ and this mixture was fired for 4 hours at a temperature of approximately 1,400°C in a mixture of 50 percent of $CO_2$, 46 percent of $N_2$ and 4 percent of $H_2$. The reaction product obtained was homogenized and once more fired in the same manner. Subsequently the reaction product was again homogenized and fired in the same gas atmosphere for 4 hours at a temperature of approximately 1,600°C. The reaction product obtained was puverized, sieved if necessary and it was then ready for use in the screen of a cathode-ray tube according to the invention.

The luminescent material obtained satisfies the formula

$$Y_{1.96}Ce_{0.04}Si_2O_7$$

As is evident a slight excess of $SiO_2$ was used during the preparation so as to enhance the course of the reaction. The efficiency of the material has 4 percent and the persistence was approximately 0.6 percent.

EXAMPLE II.

A mixture was made of
0.700 gms of $SiO_2$ ($SiO_2$-content 89.5 percent)
0.033 gms of $Ce_2O_3$
2.235 gms of $Y_2O_3$
and this mixture was fired in entirely the same manner as indicated in Example I.

The luminescent material obtained satisfies the formula

$$Y_{1.98}Ce_{0.02}SiO_5.$$

The efficiency of the material was 6 percent and the persistence was less than 0.1 percent.

Known methods may be used for providing the luminescent materials in the screen of the cathode-ray tube. A mixture of a material wherein $p = 1$ and a material wherein $p = 2$ can sometimes be used.

In FIG. 1 of the drawing the envelope of the cathode-ray tube is indicated by 1. The window is indicated by 2 whose inner side is coated with a luminescent screen 3 comprising a luminescent material as described above.

FIG. 2 of the drawing shows a graph in which the wavelength $\lambda$ is plotted in $nm$ on the abscissa and the emitted energy is plotted on the ordinate in arbitrary units. In the graph the curve 5 represents the spectral energy distribution of the materials prepared according to Example I, and the curve 6 represents the spectral energy distribution of the material prepared according to Example II. The maximum emission is fixed at 100 for both curves.

What is claimed is:

1. A trivalent cerium activated luminescent yttrium silicate consisting essentially of a solid solution corresponding to the formula

$$Y_{2(1-q)}Ce_{2q}Si_pO_{(3+2p)}$$

wherein $p$ is 1 or 2 and $2.10^{-4} \leq q \leq 2.10^{-1}$.

2. The luminescent silicate of claim 1 wherein $10^{-3} \leq q = 5.10^{-2}$.

3. The luminescent silicate of claim 2 wherein $p = 1$.

4. The luminescent silicate of claim 2 wherein $p = 2$.

5. A cathode-ray tube, comprising a discharge tube having a vacuum tight envelope, an electron gun provided within said envelope for producing an electron beam and a luminescent screen capable of being excited by said electron beam, said luminescent screen containing a trivalent cerium activated yttrium silicate phosphor of the formula $$Y_{2(1-q)}Ce_{2q}Si_pO_{(3+2p)}$$

wherein
p is 1 or 2 and
$2.10^{-4} \leq q \leq 2.10^{-1}$.

6. The cathode-ray tube of claim 5 wherein $10^{-3} \leq q = 5.10^{-2}$.

7. The cathode-ray tube of claim 6 wherein $p = 1$.

8. The cathode-ray tube of claim 6 wherein $p = 2$.

* * * * *